US012795059B2

(12) United States Patent
Cantero Clares

(10) Patent No.: US 12,795,059 B2
(45) Date of Patent: Nov. 10, 2026

(54) ELECTRONIC APPARATUS AND STEREOSCOPIC IMAGE DISPLAY METHOD THEREOF

(71) Applicant: Acer Incorporated, New Taipei City (TW)

(72) Inventor: Sergio Cantero Clares, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 213 days.

(21) Appl. No.: 18/788,144

(22) Filed: Jul. 30, 2024

(65) Prior Publication Data

US 2026/0039780 A1 Feb. 5, 2026

(51) Int. Cl.

| | |
|---|---|
| ***H04N 13/261*** | (2018.01) |
| ***H04N 1/40*** | (2006.01) |
| ***H04N 13/111*** | (2018.01) |
| ***H04N 13/302*** | (2018.01) |

(52) U.S. Cl.

CPC ....... *H04N 13/261* (2018.05); *H04N 1/40012* (2013.01); *H04N 13/111* (2018.05); *H04N 13/302* (2018.05)

(58) Field of Classification Search

CPC .. H04N 13/261; H04N 13/302; H04N 13/111; H04N 1/40012

See application file for complete search history.

(56) References Cited

U.S. PATENT DOCUMENTS

| | | | | |
|---|---|---|---|---|
| 2010/0321390 | A1* | 12/2010 | Kim | H04N 13/161 345/427 |
| 2011/0025825 | A1* | 2/2011 | McNamer | H04N 13/221 348/46 |
| 2013/0009953 | A1* | 1/2013 | Lipton | H04N 13/161 345/419 |
| 2022/0203736 | A1 | 6/2022 | Henry et al. | |
| 2023/0061009 | A1* | 3/2023 | Peng | G06V 10/26 |
| 2023/0281916 | A1 | 9/2023 | Daube et al. | |
| 2024/0121373 | A1* | 4/2024 | Lin | H04N 13/139 |
| 2026/0046383 | A1* | 2/2026 | Cantero Clares | H04N 13/117 |

FOREIGN PATENT DOCUMENTS

| | | |
|---|---|---|
| TW | 200525427 | 8/2005 |
| TW | 201215104 | 4/2012 |
| TW | 201342303 | 10/2013 |

* cited by examiner

*Primary Examiner* — John W Miller

(74) *Attorney, Agent, or Firm* — JCIPRNET

(57) ABSTRACT

An electronic apparatus and a stereoscopic image display method thereof are disclosed. The method is adapted to the electronic apparatus including a 3D display and includes the following steps. A display frame including a streaming image is obtained. A specific pattern border surrounding the streaming image in the display frame is detected by performing a line detection. In response to the specific pattern border appearing in the display frame, a stereoscopic format image is generated based on the display frame and the specific pattern border. In response to the specific pattern border appearing in the display frame, the 3D display is controlled to operate in a stereoscopic display mode to display the stereoscopic format image.

22 Claims, 16 Drawing Sheets

ELECTRONIC APPARATUS AND STEREOSCOPIC IMAGE DISPLAY METHOD THEREOF

BACKGROUND

Technical Field

The disclosure relates to an image processing technology, and in particular to an electronic apparatus and a stereoscopic image display method.

Description of Related Art

With the advancement of display technology, 3D displays that support stereoscopic vision technology have gradually become popular. Stereoscopic vision technology allows viewers to feel the three-dimensionality of images, such as the three-dimensional facial features and depth of field of characters, etc. On the other hand, traditional 2D images may not demonstrate such effect. The principle of stereoscopic vision technology is to let the viewer's left-eye view the left-eye image and let the viewer's right-eye view the right-eye image, so that the viewer may experience the stereoscopic visual effect. The 3D display respectively provides left-eye images and right-eye images to the left-eye and right-eye of the viewer, so as to provide an immersive visual experience to the viewer. It may be known that a 3D display requires corresponding 3D display technology to render the image content of a specific 3D image format in order to provide viewers with the intended stereoscopic visual effects. In other words, if a 3D display fails to accurately recognize the 3D image format of the image, the 3D display is not able to deliver a smooth and immersive 3D visual experience.

SUMMARY

The disclosure provides an electronic apparatus and its stereoscopic image display method that may effectively solve the above problems.

Example embodiments of the disclosure provide a stereoscopic image display method, which is adapted to an electronic apparatus including a 3D display and includes the following steps. A display frame including a streaming image is obtained. A specific pattern border surrounding the streaming image in the display frame is detected by performing a line detection. A stereoscopic format image is generated according to the display frame and the specific pattern border in response to the specific pattern border appearing in the display frame. The 3D display is controlled to operate in a stereoscopic display mode to display the stereoscopic format image in response to the specific pattern border appearing in the display frame.

Another exemplary embodiment of the disclosure provides an electronic apparatus, which includes a transceiver, a 3D display, and at least one processor. The processor is coupled to the transceiver and the 3D display, and is configured to preform the following operation. A display frame including a streaming image is obtained. A specific pattern border surrounding the streaming image in the display frame is detected by performing a line detection. A stereoscopic format image is generated according to the display frame and the specific pattern border in response to the specific pattern border appearing in the display frame. The 3D display is controlled to operate in a stereoscopic display mode to display the stereoscopic format image in response to the specific pattern border appearing in the display frame.

Based on the above, in embodiments of the disclosure, after obtaining the display frame including the streaming image, whether a specific pattern border surrounding the streaming image appears in the display frame is determined. If the specific pattern border appears in the display frame, the streaming image is determined to be stereoscopic streaming content conforming to the stereoscopic image format. Afterwards, a stereoscopic format image including a left-eye image and a right-eye image may be generated according to the specific pattern border and the display frame, and the 3D display is controlled to operate in a stereoscopic display mode to display the stereoscopic format image. Based on this, by embedding a specific pattern border in a stereoscopic format image, it is possible to accurately detect whether the display frame includes a streaming image conforming to the stereoscopic image format, so as to control the 3D display to automatically provide a 3D display function.

DESCRIPTION OF THE EMBODIMENTS

Some exemplary embodiments of the disclosure will be described in detail below with reference to the accompanying drawings. The component symbols cited in the following description will be regarded as the same or similar components when the same component symbols appear in different drawings. These exemplary embodiments are only part of the disclosure and do not disclose all possible implementations of the disclosure. Rather, these exemplary embodiments are merely examples of methods and apparatuses within the scope of the patent application of the disclosure.

Figure 1:
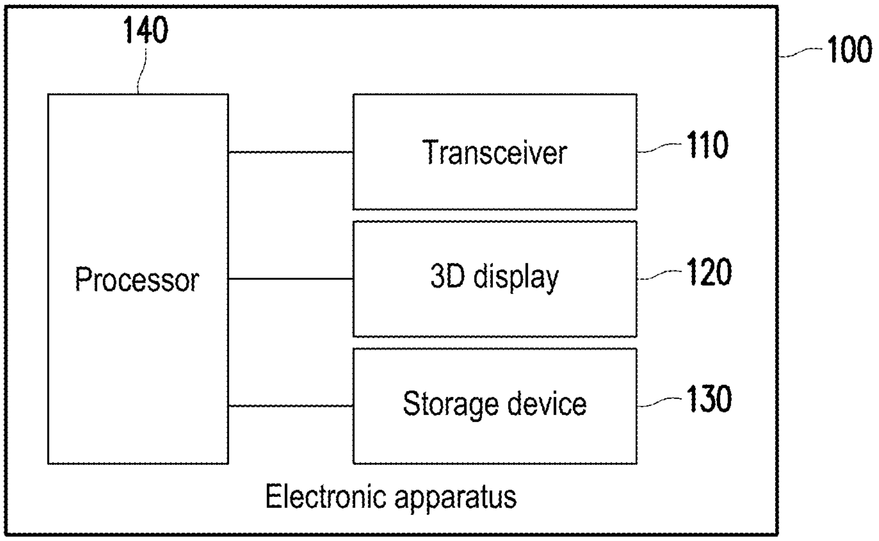
FIG. 1 is a schematic diagram of an electronic apparatus according to an embodiment of the disclosure.

FIG. 1 is a schematic diagram of an electronic apparatus according to an embodiment of the disclosure. Referring to FIG. 1, the electronic apparatus 100 may be implemented as, for example, the following electronic apparatus with image processing capabilities and computing capabilities: notebook computers, tablet computers, personal computers, game consoles, portable electronic apparatus, desktop computers or other electronic device. The electronic apparatus 100 includes a transceiver 110, a 3D display 120, a storage device 130, and at least one processor 140.

The transceiver 110 may transmit and receive signals wirelessly or wired. A transceiver may also perform operations such as low-noise amplification, impedance matching, mixing, up or down frequency conversion, filtering, amplification, and similar operations. The electronic apparatus 100 may receive and transmit data through the transceiver 110, such as receiving streaming images of video streams, etc. In some embodiments, the electronic apparatus 100 may also include an antenna (not shown) for receiving radio frequency signals.

The 3D display 120 allows the user to experience a stereoscopic visual effect. To enable users to experience 3D visual effects through 3D display 120, the 3D display 120 may let users' left and right-eyes to respectively view corresponding image contents with different perspectives based on hardware specifications and the 3D display technology. In some embodiments, the 3D display 120 may be a naked-eye stereoscopic display, which is implemented as displays for laptop computers, televisions, desktop monitors, or electronic billboards. In some embodiments, the left-eye image and right-eye image may be simultaneously displayed based on stereoscopic display technologies such as parallax barrier technology, lens technology, or directional backlight technology.

From another perspective, the 3D display 120 may include a liquid crystal display (LCD), a light-emitting diode (LED) display, an organic light-emitting diode display (OLED) or other types of displays, the disclosure is not limited thereto.

The storage device 130 is used to temporarily or permanently store data, such as images, instructions, program codes, software modules, etc. Specifically, storage device 130 may include volatile storage circuitry. Volatile storage circuits are used to store data in a volatile manner. For example, the volatile storage circuit may include random access memory (RAM) or similar volatile storage media. Alternatively, storage device 130 may include non-volatile storage circuitry. Non-volatile storage circuits are used to store data in a non-volatile manner. For example, the non-volatile storage circuit may include read only memory (ROM), solid state drive (SSD) and/or traditional hard disk drive (HDD) or similar Non-volatile storage media. The number of storage devices 130 may be one or more, and this disclosure does not limit this.

The processor 140 is connected the transceiver 110, the 3D display 120 and the storage device 130, and the processor 140 is responsible for all or part of the operations of the electronic apparatus 100. For example, the processor 140 may include a central processing unit (CPU), a graphic processing unit (GPU) or other programmable general-purpose or special-purpose microprocessor, a digital signal processor (DSP), a programmable controller, application specific integrated circuit (ASIC), programmable logic device (PLD) or other similar device or combination of these devices. The number of processors 140 may be one or more, and this disclosure does not limit this.

Figure 2:
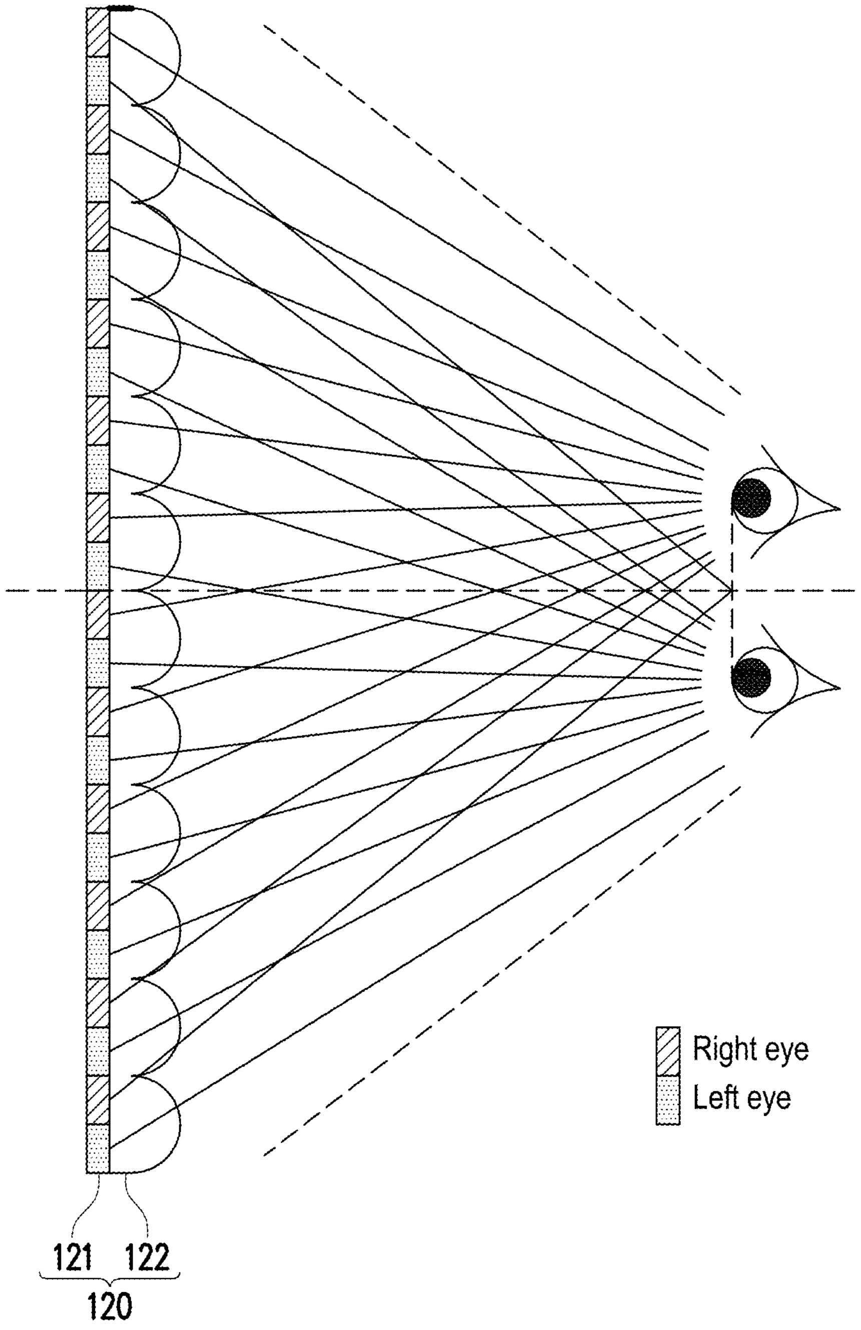
FIG. 2 is a schematic diagram of a 3D display according to an embodiment of the disclosure.

FIG. 2 is a schematic diagram of a 3D display according to an embodiment of the disclosure. Referring to FIG. 2, in some embodiments, the 3D display 120 may be a naked-eye 3D display, which may provide different images for the left-eye and the right-eye through the lens refraction principle, so that the viewer may experience the 3D display effect. The 3D display 120 may include a display panel 121 and a lens layer 122. The lens layer 122 is arranged above the display panel 121, and viewers may see the content provided by the display panel 121 through the lens layer 122. The 3D display 120 may respectively place the pixels of the left-eye image and the pixels of the right-eye image at corresponding pixel positions of the display panel 121. The lens layer 122 refracts different display contents (i.e., the left-eye image and the right-eye image) to different positions in space through the refraction of light, so that the left-eye and the right-eye may respectively receive two different images with parallax. To position the pixels of the left-eye image and the right-eye image at the corresponding pixel locations on the display panel 121, the left-eye image and the right-eye image need to undergo image weaving processing to generate an interleaved frame where the pixels of the left-eye image and the right-eye image are arranged in an interleaved manner.

Figure 3:
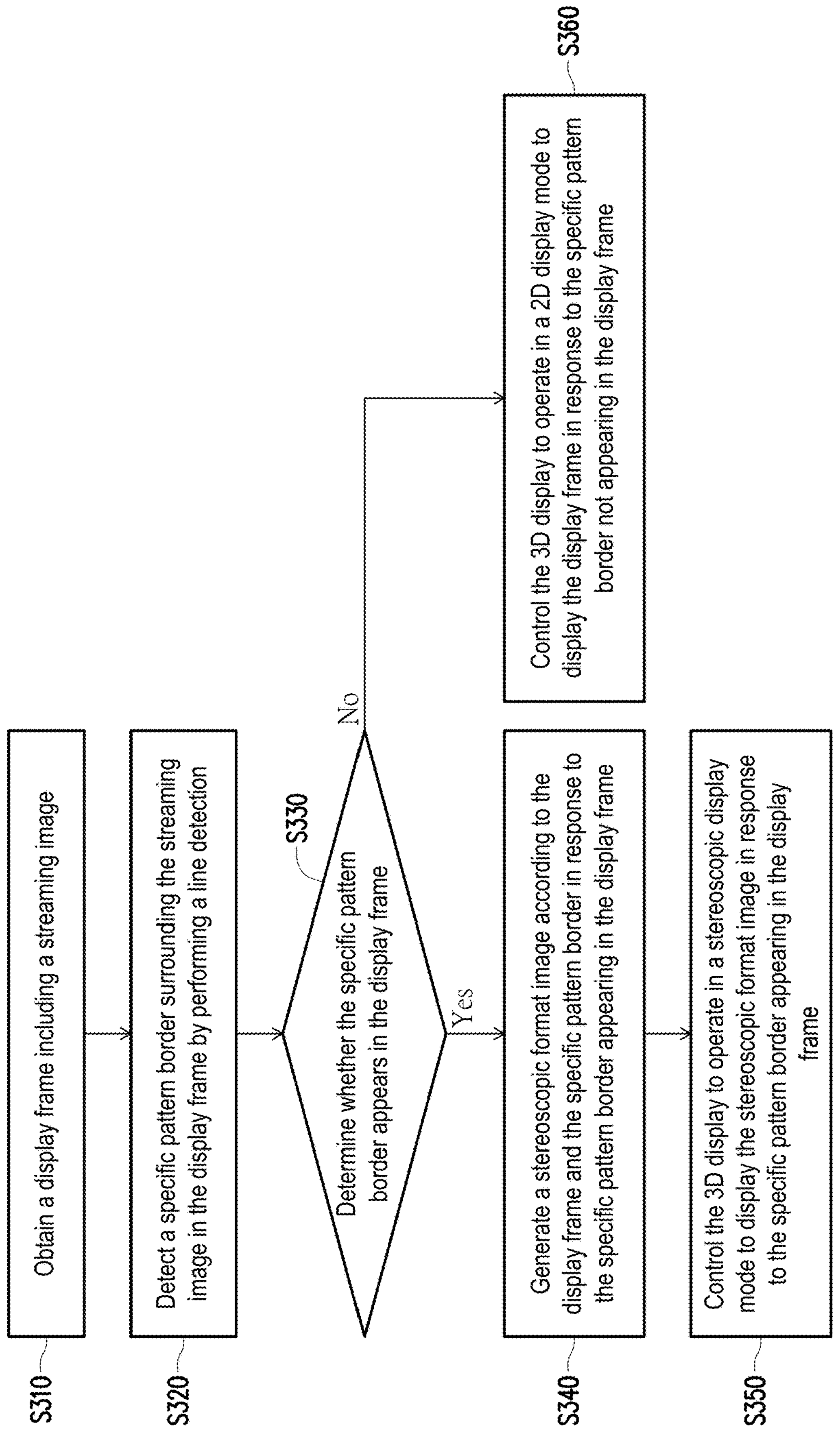
FIG. 3 is a flowchart of a stereoscopic image display method according to an embodiment of the disclosure.

FIG. 3 is a flowchart of a stereoscopic image display method according to an embodiment of the disclosure. Referring to FIG. 3, the operation process of this embodiment is applicable to the electronic apparatus 100 in the above embodiment. The detailed steps of this embodiment are described below with reference to various components in the electronic apparatus 100.

In step S310, the processor 140 may obtain a display frame including a streaming image. Specifically, the processor 140 may receive the streaming image through the transceiver 110 and generate a display frame including the streaming image. In some embodiments, the processor 140 may utilize a screenshot function to obtain the display frame including the streaming image. In some embodiments, the streaming image may originate from a video stream of a video conferencing application, a video stream of a multimedia player application or a video stream of a browser application. In some embodiments, when the processor 140 executes a video conferencing software, the processor 140 may receive the streaming image provided by a conference participant through the transceiver 110 and generate a display frame including a graphical user interface of the video conferencing software and the streaming image.

In some embodiments, the processor 140 may retrieve the display frames through an application programming interface (API) provided by the operating system (OS). For example, the processor 140 may use a screen capture technology such as "Desktop Duplication API" or "DirectX Graphics Infrastructure (DXGI)" of the Windows operating system to obtain the display frames, but is not limited thereto.

In step S320, the processor 140 may detect a specific pattern border surrounding the streaming image in the display frame by performing line detection. In step S330, processor 140 may determine whether a specific pattern border appears in the display frame.

Specifically, in an embodiment of the disclosure, a specific pattern border may be embedded around the image that conforms to the stereoscopic image format. In some embodiments, a specific pattern border may have a specific color and a specific outline. Therefore, when the streaming image in the display frame has a specific pattern border, the processor 140 may determine that the streaming image conforms to the stereoscopic image format. The above-mentioned stereoscopic image format is, for example, Side-by-Side (SBS) image format, which is not limited by the disclosure. The operation of embedding a specific pattern border into stereoscopic format images may be achieved by post-processing the images conforming to the stereoscopic image format. Alternatively, through a specially designed stereoscopic image capturing device, the stereoscopic image capturing device may directly output a stereoscopic format image embedded with a specific pattern border.

In some embodiments, the specific pattern border may be constituted by multiple line segments, so the processor 140 may determine whether the specific pattern border appears in the display frame by performing line detection. In different embodiments, the processor 140 may perform line detection based on a Hough transform procedure or other line detection algorithms.

Figure 4A:
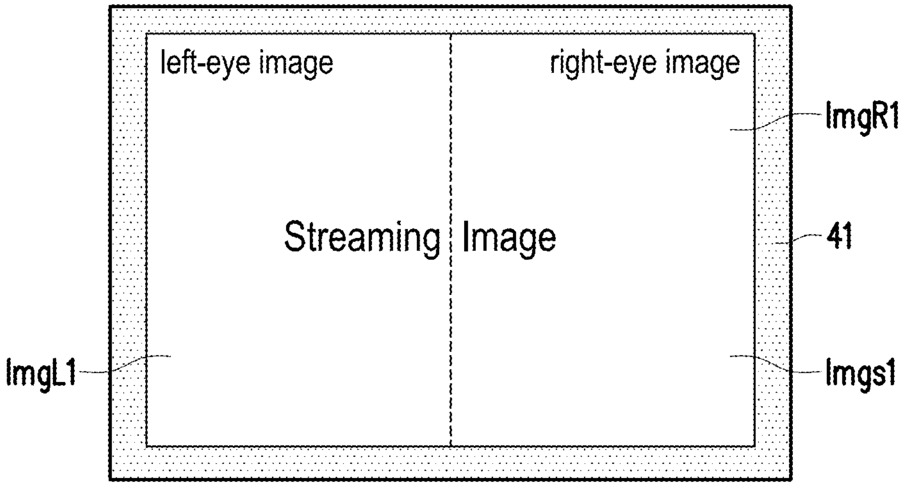
FIG. 4A and FIG. 4B are schematic diagrams of specific pattern borders according to embodiments of the disclosure.
Figure 4B:
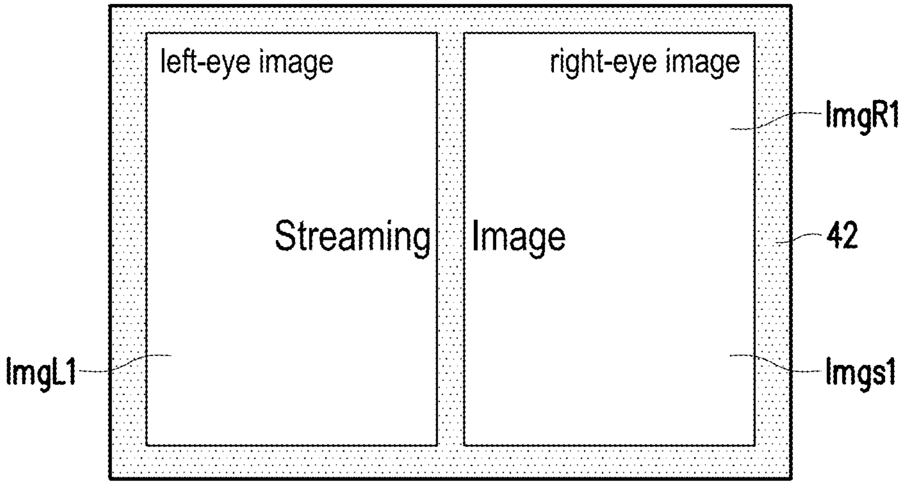

For example, FIG. 4A and FIG. 4B are schematic diagrams of a specific pattern border according to an embodiment of the disclosure. Referring to FIG. 4A, the streaming image Imgs1 conforming to the side-by-side image format includes a left-eye image ImgL1 and a right-eye image ImgR1. A specific pattern border 41 appearing as a rectangular outline may be embedded in the streaming image Imgs1. The width of the border line of the specific pattern border 41 may be n pixels (for example, 6 pixels), which is not limited by the disclosure. Based on this, when the processor 140 receives the streaming image Imgs1 through the transceiver 110 and generates a display frame including the streaming image Imgs1, the processor 140 may identify the specific pattern border 41 in the display frame by performing line detection.

Alternatively, referring to FIG. 4B, the specific pattern border 42 may be embedded in the streaming image Imgs1. In addition to the rectangular outline surrounding the streaming image Imgs1, the specific pattern border 42 also includes a vertical midline located between the left-eye image ImgL1 and the right-eye image ImgR1. Based on this, when the processor 140 receives the streaming image Imgs1 through the transceiver 110 and generates a display frame including the streaming image Imgs1, the processor 140 may identify the specific pattern border 42 in the display frame by performing line detection.

If the determination in step S330 is yes, the streaming image received by the electronic apparatus 100 conforms to the stereoscopic image format. In step S340, in response to the specific pattern border appearing in the display frame, the processor 140 generates a stereoscopic format image according to the display frame and the specific pattern border. This stereoscopic format image is a side-by-side image including a first perspective image and a second perspective image. The first perspective image may be a left-eye image, and the second perspective image may be a right-eye image. Alternatively, the first perspective image may be a right-eye image, and the second perspective image may be a left-eye image.

Specifically, since the user may scale or move the application window of the application, the size and position of the streaming image within the application window in the display frame are variable. In the embodiment of the disclosure, in response to the movement or scaling of the application window, the specific pattern border surrounding the streaming image in the display frame may be also moved and scaled accordingly. Therefore, based on the range inside and defined by a specific pattern border surrounding the streaming image within the display frame, the processor 140 may obtain the image occupancy range of the streaming image that complies with the stereoscopic image format in the display frame. According to the image occupancy range of the streaming image in the display frame, the processor 140 may distinguish the two-dimensional background block in the display frame and the streaming content block belonging to 3D content.

Therefore, the processor 140 may generate the left-eye image and the right-eye image of the stereoscopic format image according to the two-dimensional background block and the streaming content block in the display frame. Specifically, the left-eye image of the stereoscopic format image may include a left-eye image of the streaming image and the two-dimensional background block in the display frame. The right-eye image of the stereoscopic format image may include a right-eye image of the streaming image and the two-dimensional background block in the display frame. In other words, the stereoscopic format image simultaneously includes 3D image content with parallax and a two-dimensional background without parallax.

In step S350, in response to the specific pattern border appearing in the display frame, the processor 140 controls the 3D display 120 to operate in the stereoscopic display mode to display the stereoscopic format image. Specifically, when the 3D display 120 is a naked-eye 3D display, the processor 140 may perform image weaving processing on the stereoscopic format image (such as an SBS image) to obtain a weaving image. This image weaving processing makes the pixels of the left-eye image of the stereoscopic format image are interleaved with the pixels of the right-eye image in the weaving image. Afterwards, when the 3D display 120 operates in the stereoscopic display mode, the display panel 121 of the 3D display 120 will display the weaving image, and the refraction function of the lens layer 121 of the 3D display 120 is enabled, so that the viewer may experience the stereoscopic visual effect.

For example, in the operating scenario of the processor 140 executing the video conferencing software, in response to a specific pattern border appearing in the display frame, the 3D display 120 may enable the 3D display function and display the stereoscopic streaming content provided by the conference participant and graphical user interface of the video conferencing software. Therefore, the user may experience the stereoscopic visual effect in response to the specific pattern border appearing in the display frame.

On the other hand, if the determination of step S330 is No, it means that the streaming image may not comply with the stereoscopic image format. In step S360, in response to that the specific pattern border does not appear in the display frame, the processor 140 may control the 3D display 120 to operate in the two-dimensional display mode to display the display frame. In some embodiments, when the 3D display 120 which is a naked-eye 3D display operating in a two-dimensional display mode without providing a 3D display function, the display panel 121 of the 3D display 120 will output display frames, and the refractive function of the lens layer 121 of the stereoscopic display 120 is disabled.

For example, in the operating scenario of the processor 140 executing the video conferencing software, in response to the specific pattern border not appearing in the display frame, the 3D display 120 may disable the 3D display function and display the display frame including the streaming image and the GUI of the video conferencing software.

Figure 5:
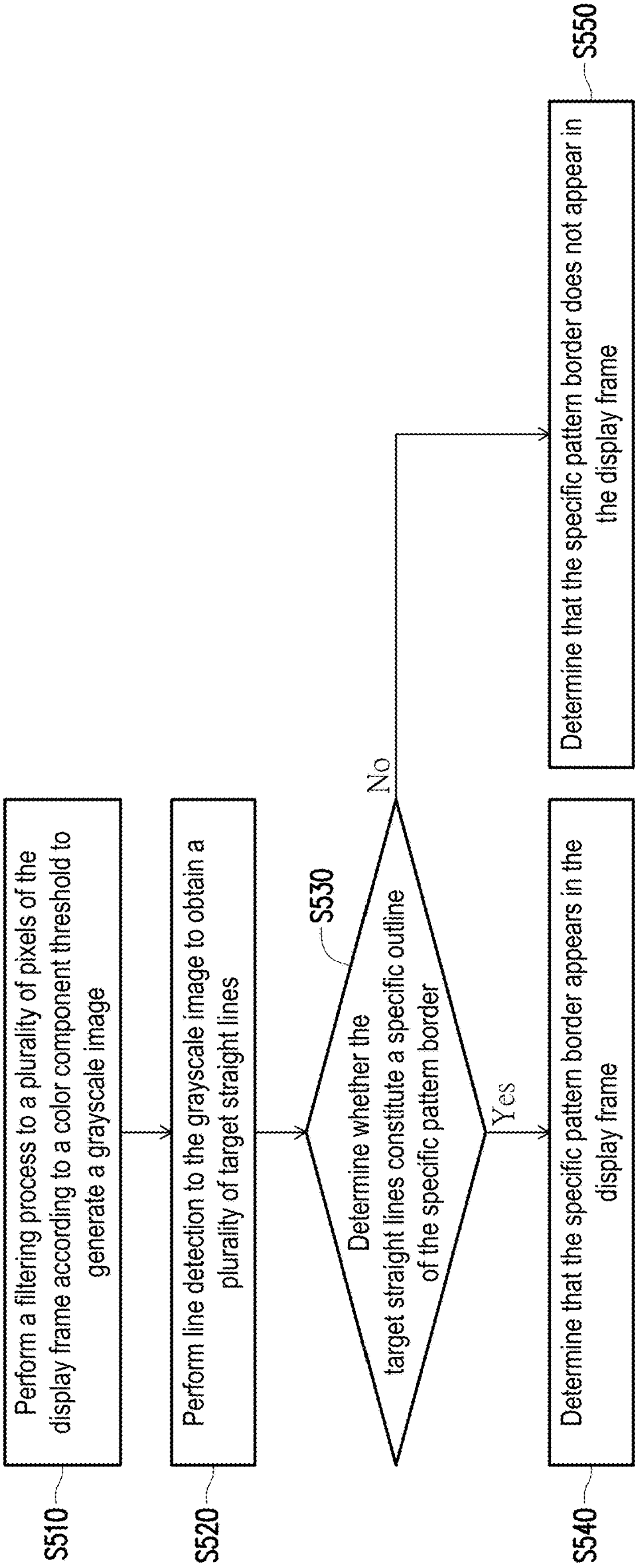
FIG. 5 is a flowchart of detecting a specific pattern border according to an embodiment of the disclosure.

FIG. 5 is a flowchart of detecting a specific pattern border according to an embodiment of the disclosure. Referring to FIG. 5, the operation process of the embodiment is applicable to the electronic apparatus 100 in the above embodiment. The detailed steps of this embodiment are described below with reference to various components in the electronic apparatus 100.

In step S510, the processor 140 may perform a filtering process to a plurality of pixels of the display frame according to a color component threshold to generate a grayscale image. The grayscale image includes a plurality of first grayscale pixels corresponding to the first grayscale and a plurality of second grayscale pixels corresponding to the second grayscale. There is a grayscale difference between the first grayscale and the second grayscale. In some embodiments, the first grayscale is white, and the second grayscale is black. Or, the first grayscale is black, and the second grayscale is white. If the color component of one of the pixels in the display frame is greater than the color component threshold, one of the pixels is converted into one of the first grayscale pixels. If the color component of another one of the pixels in the display frame is not greater than the color component threshold, the another one of the pixels is converted into one of the second grayscale pixels.

Specifically, since the color of a specific pattern border are predetermined, the processor 140 may first perform color detection on each pixel of the display frame to filter out pixels that may belong to the specific pattern border. By comparing the color component (such as R channel component, G channel component or B channel component) of each pixel with the color component threshold, the processor 140 may distinguish qualified pixels matching the color characteristics of the specific pattern border and unqualified pixels not matching the color characteristics of a specific pattern border. The processor 140 may convert the qualified pixels that match the color characteristics of the specific pattern border into the first grayscale pixel (such as a white pixel) in the grayscale image, and convert the unqualified pixels that do not match the color characteristics of the specific pattern border into the second grayscale pixel (e.g., black pixel) in the grayscale image.

For example, assuming that the specific pattern border is green corresponding to the RGB color coordinates (0, 255, 0), the processor 140 may convert multiple pixels whose G channel component is greater than the color component threshold into white pixels, and convert the remaining pixels whose G channel component is not greater than the color component threshold to black pixels. The color component threshold may be configured according to actual applications, which is not limited by this disclosure. It should be noted that, Due to the image encoding and decoding processing undergone by the specific patterned border embedded in the streaming image, slight color shifts may occur. However, the use of color component threshold in the filtering process can mitigate the adverse effects of the aforementioned color shifts on the detection accuracy of the specific patterned border.

In step S520, the processor 140 may perform line detection to the grayscale image to obtain a plurality of target straight lines. The target straight lines include vertical straight lines and horizontal straight lines. In some embodiments, the processor 140 may perform line detection based on a Hough transform procedure. Specifically, the processor 140 may perform edge detection to obtain the edges in the grayscale image, and select the vertical straight lines and the horizontal straight lines whose length is greater than a length threshold value from these detected edges. However, regarding line detection, the Hough transform program or other line detection algorithms that are well known to those skilled in the art may be used without specific limitations.

In step S530, the processor 140 may determine whether the target straight lines constitute a specific outline of the specific pattern border. For example, the specific outline may be a specific rectangular outline (as shown in the example of FIG. 4A). The processor 140 may determine whether the target straight lines in the grayscale image may form a rectangular outline or other outlines with other shape.

If the determination in step S530 is yes, in step S540, in response to determining that the target straight lines constitute the specific outline, the processor 140 determines that a specific pattern border appears in the display frame. If the determination in step S530 is no, in step S550, in response to determining that the target straight lines do not constitute the specific outline, the processor 140 may determine that the specific pattern border does not appear in the display frame. When the processor 140 determines that the target straight lines in the grayscale image constitute the specific outline of the specific pattern border, the processor 140 may determine that the specific pattern border is appearing in the display frame.

Figure 6:
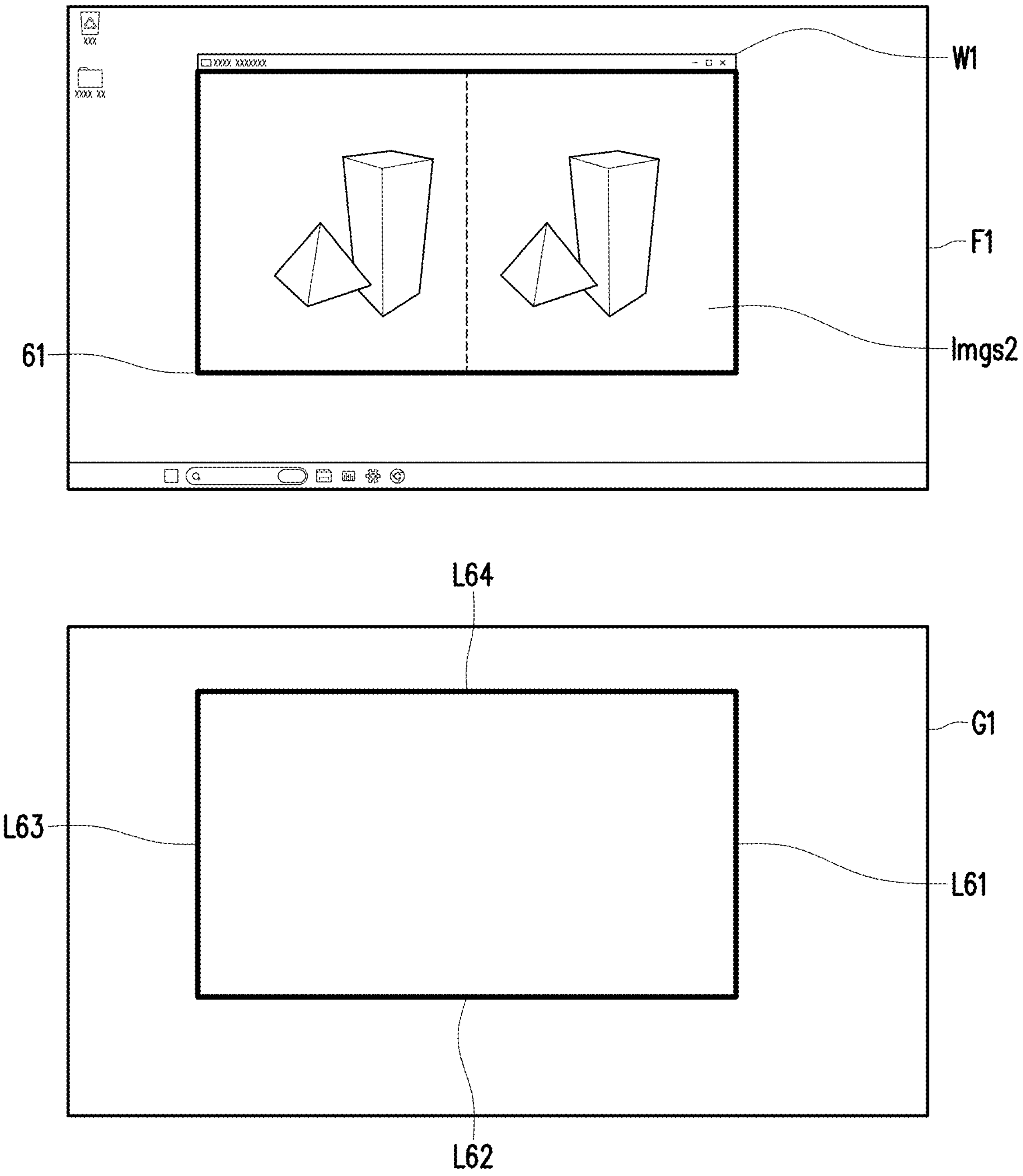
FIG. 6 is a schematic diagram of detecting a specific pattern border according to an embodiment of the disclosure.

For example, FIG. 6 is a schematic diagram of detecting a specific pattern border according to an embodiment of the disclosure. Referring to FIG. 6, the processor 140 may capture the display frame F1. The display frame F1 includes an application window W1, and the application window W1 includes a streaming image Imgs2 that conforms to the side-by-side image format. A specific pattern border 61 is embedded around the streaming image Imgs2. In this example, the processor 140 may perform a filtering process to all pixels of the display frame F1 according to the color component threshold to generate the grayscale image G1. The grayscale image G1 may include grayscale pixels corresponding to two different grayscales. For example, the grayscale image G1 may be a black and white image. Afterwards, the processor 140 may obtain the target straight lines L61 to L64 by performing line detection. The processor 140 may determine that the target straight lines L61 to L64 form a specific rectangular outline, and therefore determine that the specific pattern border 61 appears in the display frame F1, and thereby confirm that the streaming image Imgs2 is a side-by-side image.

Figure 7:
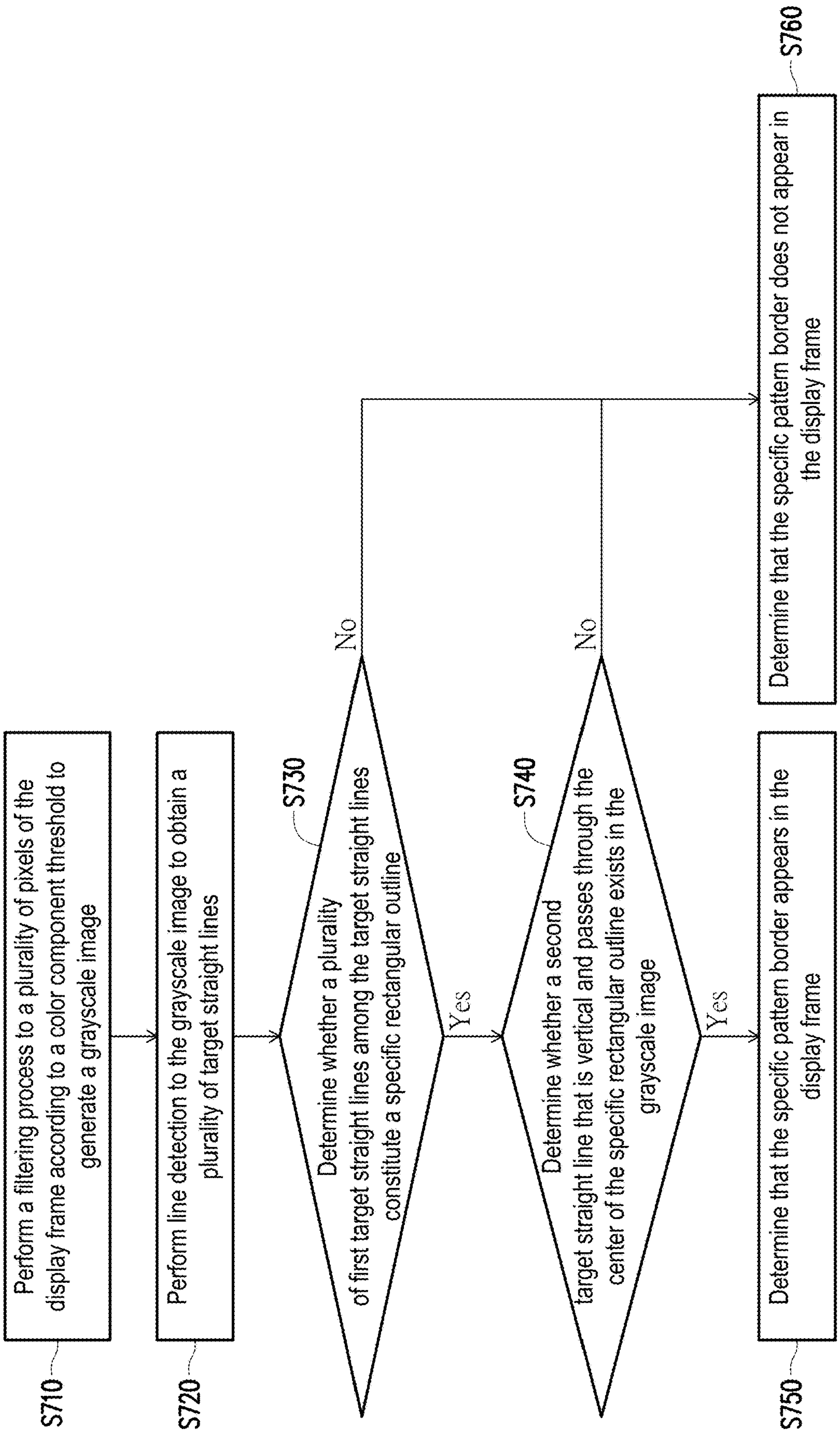
FIG. 7 is a flowchart of detecting a specific pattern border in a display frame according to an embodiment of the disclosure.

FIG. 7 is a flowchart of detecting a specific pattern border in a display frame according to an embodiment of the disclosure. Referring to FIG. 7, the operation process of this embodiment is applicable to the electronic apparatus 100 in the above embodiment. The detailed steps of this embodiment are described below with reference to various components in the electronic apparatus 100.

In step S710, the processor 140 may perform a filtering process to a plurality of pixels of the display frame according to a color component threshold to generate a grayscale image. In step S720, the processor 140 may perform the line detection on the grayscale image to obtain a plurality of target straight lines. In step S730, the processor 140 may determine whether a plurality of first target straight lines among the target straight lines constitute a specific rectangular outline. The detailed operations of the above steps can refer to the description provided in the previous embodiments, and will not be reiterated again.

If the determination in step S730 is yes, in step S740, the processor 140 may determine whether the second target straight line being vertical and passing through the center of the specific rectangular outline exists in the grayscale image. Specifically, in one embodiment, the specific outline of the specific pattern border may be as shown in the example of FIG. 4B. Therefore, the processor 140 needs to further determine whether the specific rectangular outline appearing in the grayscale image includes a vertical midline (i.e., the second target straight line).

If the determination in step S740 is yes, in step S750, in response to determining that the target straight lines constitute the specific outline, the processor 140 may determine that a specific pattern border appears in the display frame. If the determination in step S730 is no or the determination in step S740 is no, in step S760, in response to determining that the target straight lines do not constitute the specific outline, the processor 140 may determine that the specific pattern border does not appear in the display frame.

Figure 8:
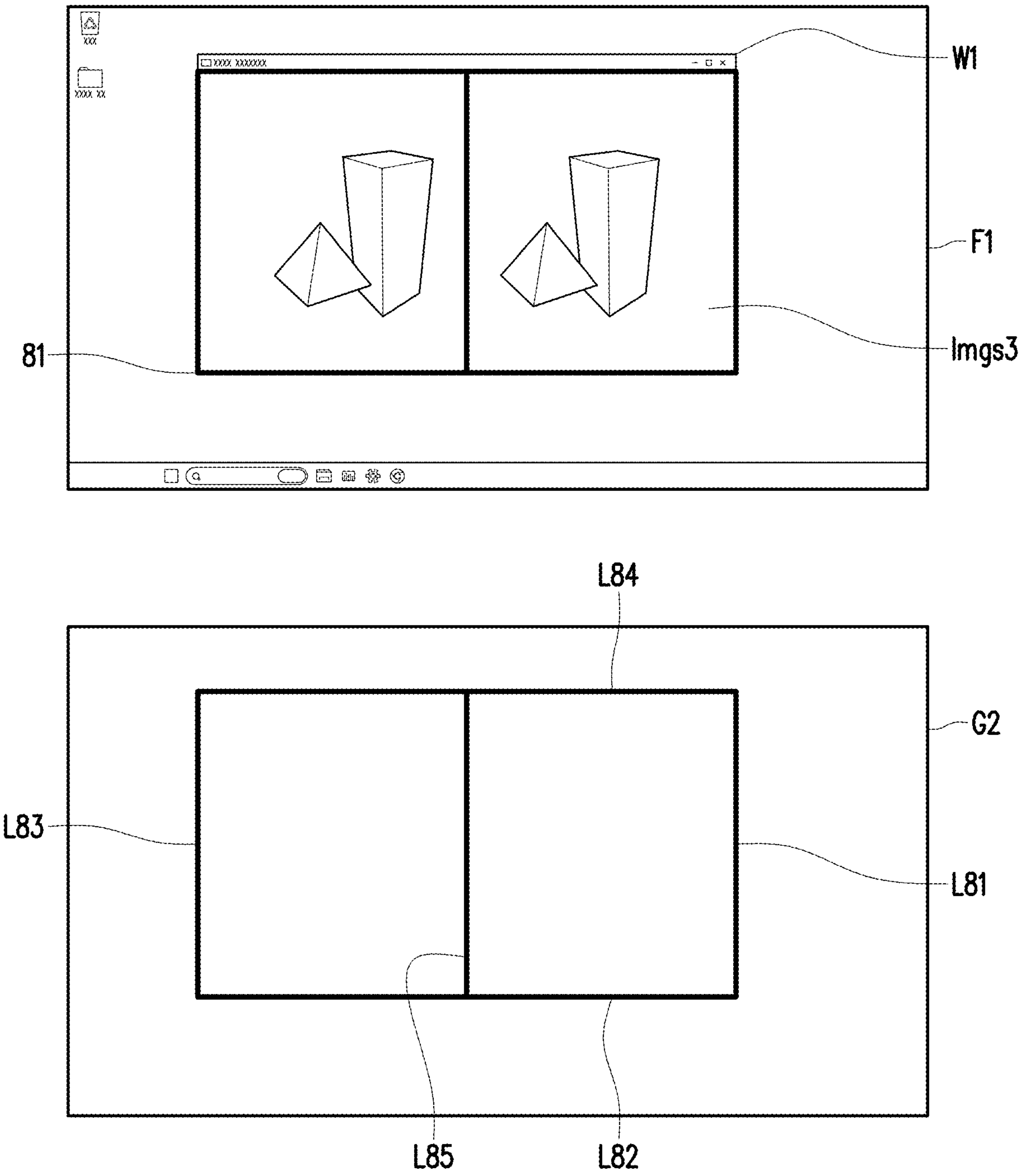
FIG. 8 is a schematic diagram of detecting a specific pattern border according to an embodiment of the disclosure.

For example, FIG. 8 is a schematic diagram of detecting a specific pattern border according to an embodiment of the disclosure. Referring to FIG. 8, the processor 140 may capture the display frame F1. The display frame F1 includes an application window W1, and the application window W1 includes a streaming image Imgs3 that conforms to the side-by-side image format. The specific pattern border 81 is embedded around the streaming image Imgs3 and at the boundary between the left-eye image and the right-eye image. In this example, the processor 140 may perform a filtering process to all pixels of the display frame F1 according to the color component threshold to generate the grayscale image G2. Afterwards, the processor 140 may obtain multiple target straight lines L81 to L85 through the line detection. The processor 140 may determine that the target straight lines L81 to L84 form a specific rectangular outline, and determine that the vertical target straight line L85 passes through the center of the specific rectangular outline. Therefore, the processor 140 may determine that the specific pattern border 81 appears in the display frame F1, and accordingly confirm that the streaming image Imgs3 is a side-by-side image.

Figure 9:
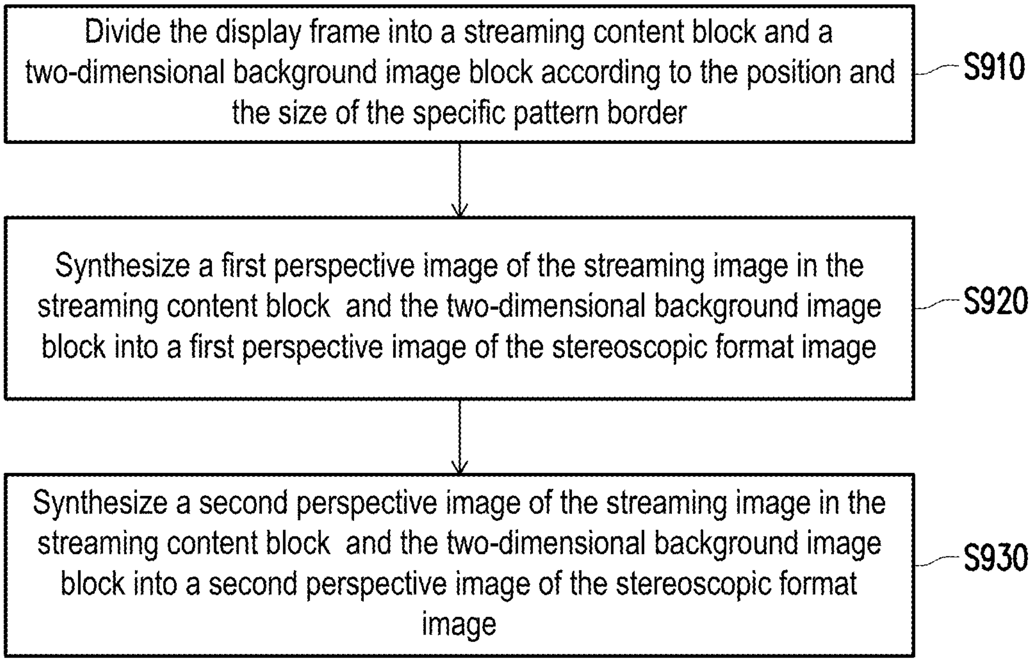
FIG. 9 is a flowchart of generating a stereoscopic format image according to an embodiment of the disclosure.
Figure 10:
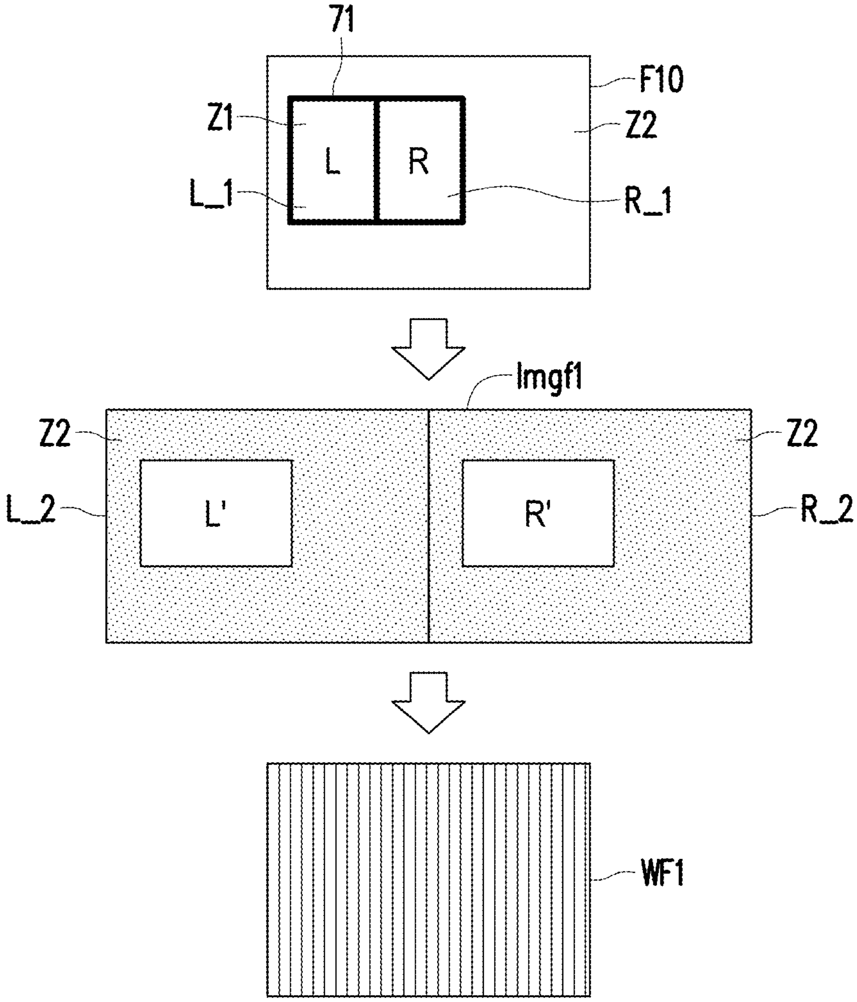
FIG. 10 is a schematic diagram of generating a stereoscopic format image and a weaving frame according to an embodiment of the disclosure.

FIG. 9 is a flowchart of generating a stereoscopic format image according to an embodiment of the disclosure. Referring to FIG. 9, the operation process of this embodiment is applicable to the electronic apparatus 100 in the above embodiment. The detailed steps of this embodiment are described below with reference to various components in the electronic apparatus 100. To clearly illustrate the principles of this embodiment, the explanation is supplemented with FIG. 10. FIG. 10 is a schematic diagram of generating stereoscopic format images and weaving frames according to an embodiment of the disclosure.

Referring to FIG. 9 and FIG. 10 together, in step S910, the processor 140 may divide the display frame F10 into a streaming content block Z1 and a two-dimensional background image block Z2 according to the position and size of the specific pattern border 71. The streaming content block Z1 includes a streaming image that conforms to the stereoscopic image format and includes a first perspective image L_1 (i.e., a left-eye image) and a second perspective image R_1 (i.e., a right-eye image).

In step S920, the processor 140 may synthesize the first perspective image L_1 of the streaming image in the streaming content block Z1 and the two-dimensional background image block Z2 into the first perspective image L_2 of the stereoscopic format image Imgf1. Specifically, the processor 140 may perform image scaling processing on the first perspective image L_1 of the streaming image according to the display block size of the streaming content block Z1. The processor 140 may synthesize the scaled first perspective image L_1 and the two-dimensional background image block Z2 according to the display position of the streaming content block Z1 to generate the first perspective image L_2.

In step S930, the processor 140 may synthesize the second perspective image R_1 of the streaming image in the streaming content block Z1 and the two-dimensional background image block Z2 into the second perspective image R_2 of the stereoscopic format image Imgf1. The method of generating the second perspective image R_2 is similar to the method of generating the first perspective image L_2, which will not be described again. It should be noted that the two-dimensional background image block Z2 in the first perspective image L_2 of the stereoscopic format image Imgf1 is identical with the two-dimensional background image block Z2 in the second perspective image R_2 of the stereoscopic format image Imgf1, that is, there is no parallax between the two-dimensional background image block Z2 in the first perspective image L_2 and the two-dimensional background image block Z2 in the second perspective image R_2.

In some embodiments, when the 3D display 120 is a naked-eye 3D display, the processor 140 may perform an image weaving process on the stereoscopic format image Imgf1 to generate a weaving frame WF1. Such that, when the 3D display 120 displays the weaving frame WF1, the viewer may see the stereoscopic streaming content with a stereoscopic visual effect.

Figure 11:
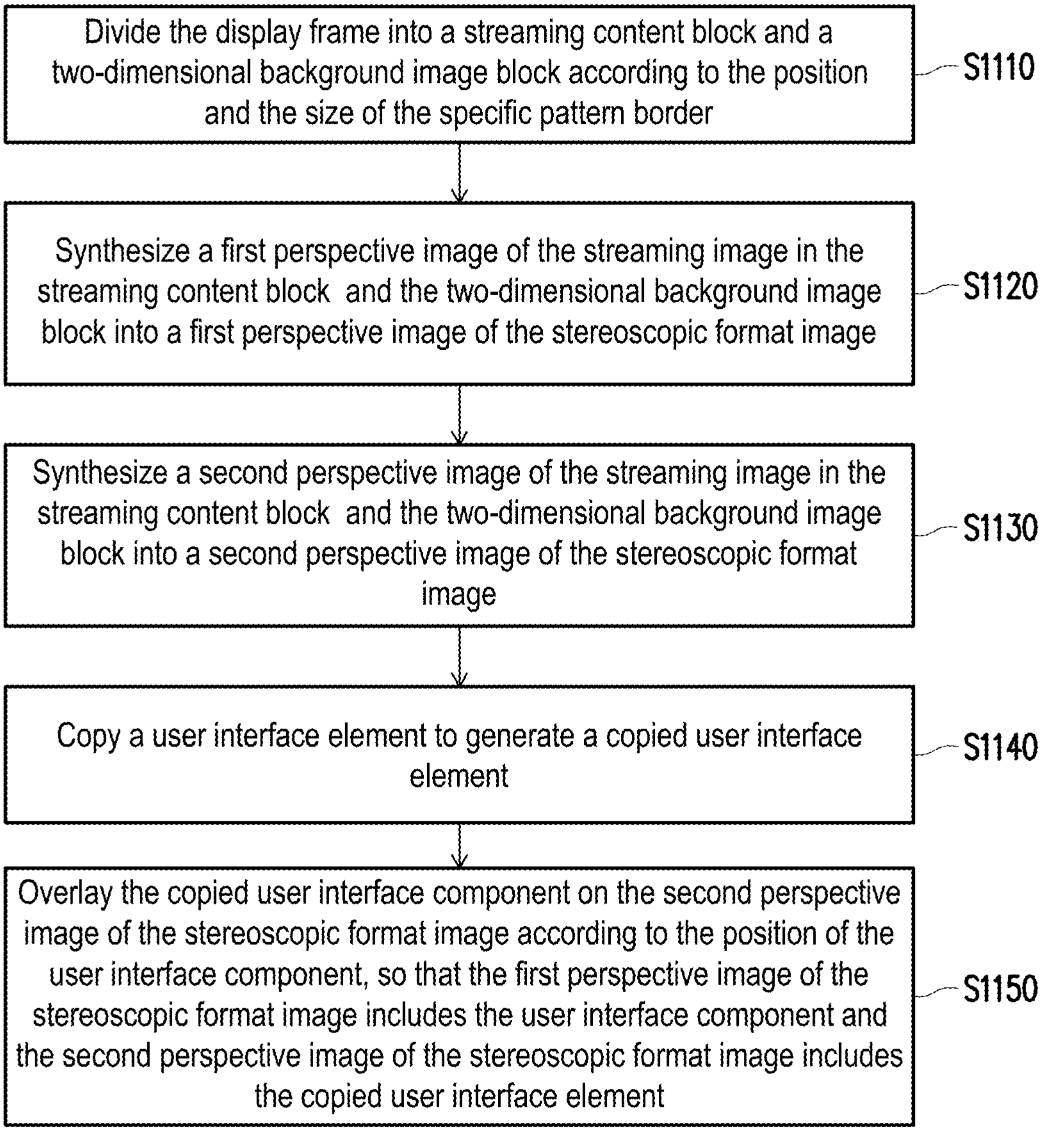
FIG. 11 is a flowchart of generating a stereoscopic format image according to an embodiment of the disclosure.

FIG. 11 is a flowchart for generating a stereoscopic format image according to an embodiment of the disclosure. Referring to FIG. 11, the operation process of this embodiment is applicable to the electronic apparatus 100 in the above embodiment. The detailed steps of this embodiment are described below with reference to various components in the electronic apparatus 100.

In step S1110, the processor 140 may divide the display frame into streaming content blocks and two-dimensional background image blocks according to the position and size of the specific pattern border. The streaming content block includes the streaming image conforming to the stereoscopic image format. In step S1120, the processor 140 may synthesize the first perspective image of the streaming image in the streaming content block and the two-dimensional background image block into the first perspective image of the stereoscopic format image. In step S1130, the processor 140 may synthesize the second perspective image of the streaming image in the streaming content block and the two-dimensional background image block into the second perspective image of the stereoscopic format image. The detailed operations from step S1110 to step S1130 may be described with reference to the foregoing embodiments, and will not be described again here.

It should be noted that in some operating scenarios, the graphical user interface of the application may include a user interface element overlaying on the streaming image, and this user interface element may overlay on one of the left-eye image and the right-eye image of the streaming image. Therefore, when a stereoscopic format image is generated based on the captured display frame, the user interface element would only be drawn in the left-eye image or the right-eye image of the stereoscopic format image. As a result, the image content of the left-eye image or the right-eye image of the stereoscopic format image will be inconsistent, causing the 3D display effect to be adversely affected. Therefore, in this embodiment, the processor 140 may copy the user interface element overlaid on the certain perspective image to another perspective image, so that the image content of the left-eye image and the right-eye image of the stereoscopic format image are consistent.

Therefore, in step S1140, the processor 140 may copy the user interface element to generate a copied user interface element. This user interface element overlays on the first perspective image of the streaming image in the display frame. In some embodiments, the component information of user interface elements in the window operation interface is known, so the processor 140 may perform a copy operation on the user interface element overlaid on the first perspective image of the streaming image. That is to say, the processor 140 may perform a copy operation on the user interface element located within the image range defined by the specific pattern border.

In step S1150, the processor 140 may overlay the copied user interface element on the second perspective image of the stereoscopic format image according to the position of the user interface element, so that the first perspective image of the stereoscopic format image includes the user interface element and the second perspective image of the stereoscopic format image includes the copied user interface element. Therefore, it is possible to prevent user interface elements from being visible to only the left-eye or right-eye of the viewer.

Figure 12:
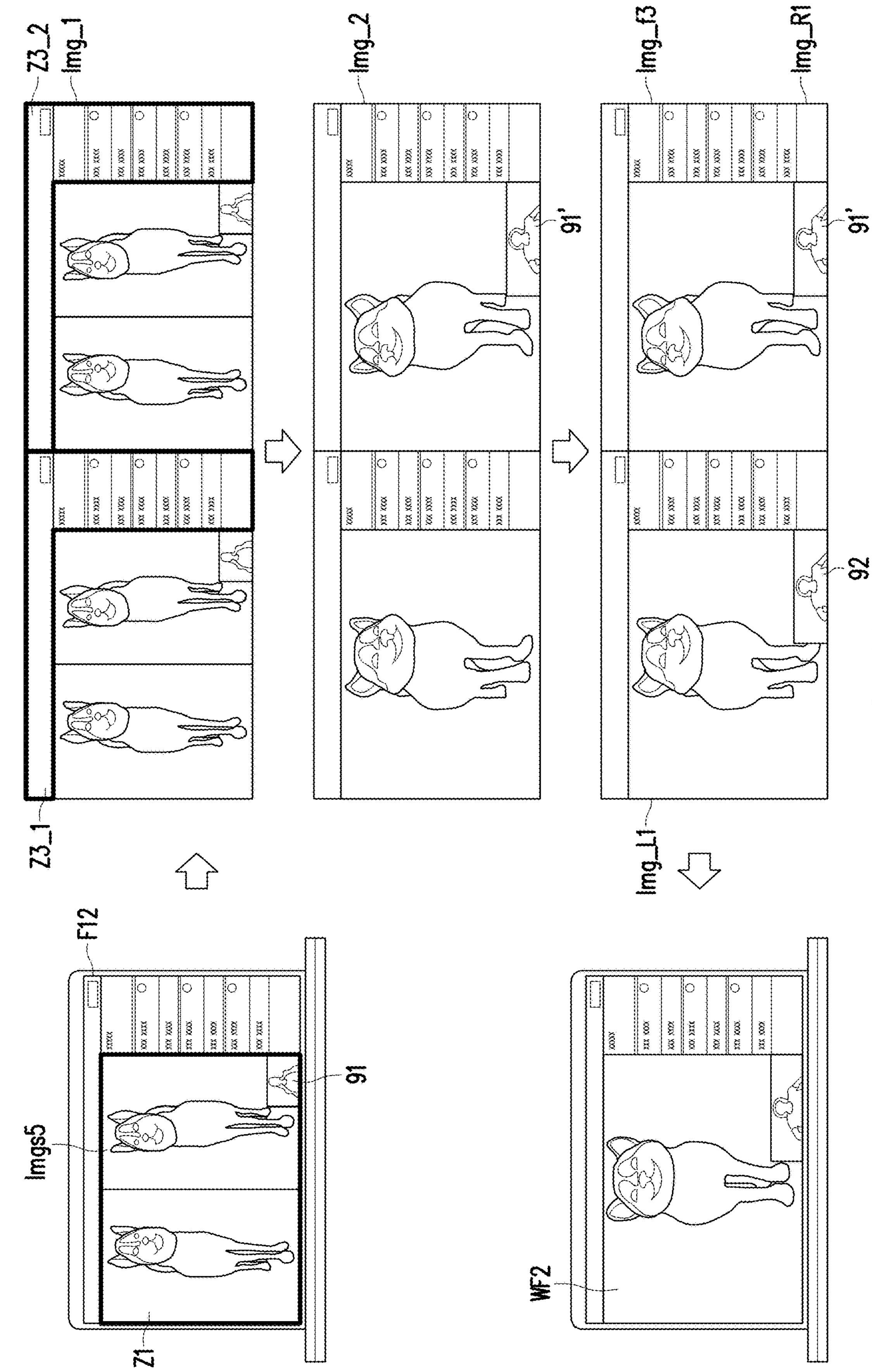
FIG. 12 is a schematic diagram of copying a user interface element to generate a stereoscopic format image according to an embodiment of the disclosure.

For example, FIG. 12 is a schematic diagram of copying user interface elements to generate a stereoscopic format image according to an embodiment of the disclosure. Referring to FIG. 12, when the processor 140 executes the video conferencing software, the processor 140 may capture the display frame F12. The display frame F12 includes the graphical user interface of the video conferencing software and the streaming image conforming to the side-by-side image format. Based on this, the processor 140 may recognize the specific pattern border in the display frame F12 and determine that the streaming image Imgs5 is a side-by-side image. It should be noted that the graphical user interface of the video conferencing software also includes a user interface element 91 overlaid on the left-eye image of the streaming image Imgs5. The user interface element 91 is, for example, a portrait screen of conference participants. Since the specific pattern border is recognized in the display frame F12, the processor 140 may generate the stereoscopic format image Imgf3 according to the display frame F12.

Specifically, by copying the two-dimensional background area outside the specific pattern border in the display frame F12, the processor 140 may draw the two-dimensional background area Z3_1 of the left-eye image and the two-dimensional background area Z3_2 of the right-eye image in the first image Img_1. Next, the processor 140 may perform scaling processing on the left half image content in the streaming content block Z1, and compose the scaled image and the two-dimensional background block in the first image Img_1 to generate the left-eye image of the second image Img_2. In addition, the processor 140 may perform scaling processing on the right half image content in the streaming content block Z1, and compose the scaled image and the two-dimensional background block in the first image Img_1 to generate the right-eye image of the second image Img_2.

Then, the processor 140 may copy the user interface element 91' overlayed on the right-eye image of the second image Img_2, and overlay the copied user interface element 92 on the left-eye image of the second image Img_2 to generate the stereoscopic format image Imgf3. As shown in FIG. 12, the left-eye image Img_L1 of the stereoscopic format image Imgf3 includes the image content of the left-eye image of the streaming image Imgs5, a two-dimensional background image outside the specific pattern border in the display frame F12, and a copied user interface element 92. In addition, the right-eye image Img_R1 of the stereoscopic format image Imgf3 includes the image content of the right-eye image of the streaming image Imgs5, the two-dimensional background image outside the specific pattern border in the display frame F12, and the user interface element 91'. That is, the image content of the right-eye image Img_R1 and the left-eye image Img_L1 of the stereoscopic format image Imgf3 are consistent. Finally, the processor 140 may perform image weaving processing on the stereoscopic format image Imgf3, and drive the 3D display 120 to display the weaving frame WF2.

Figure 13A:
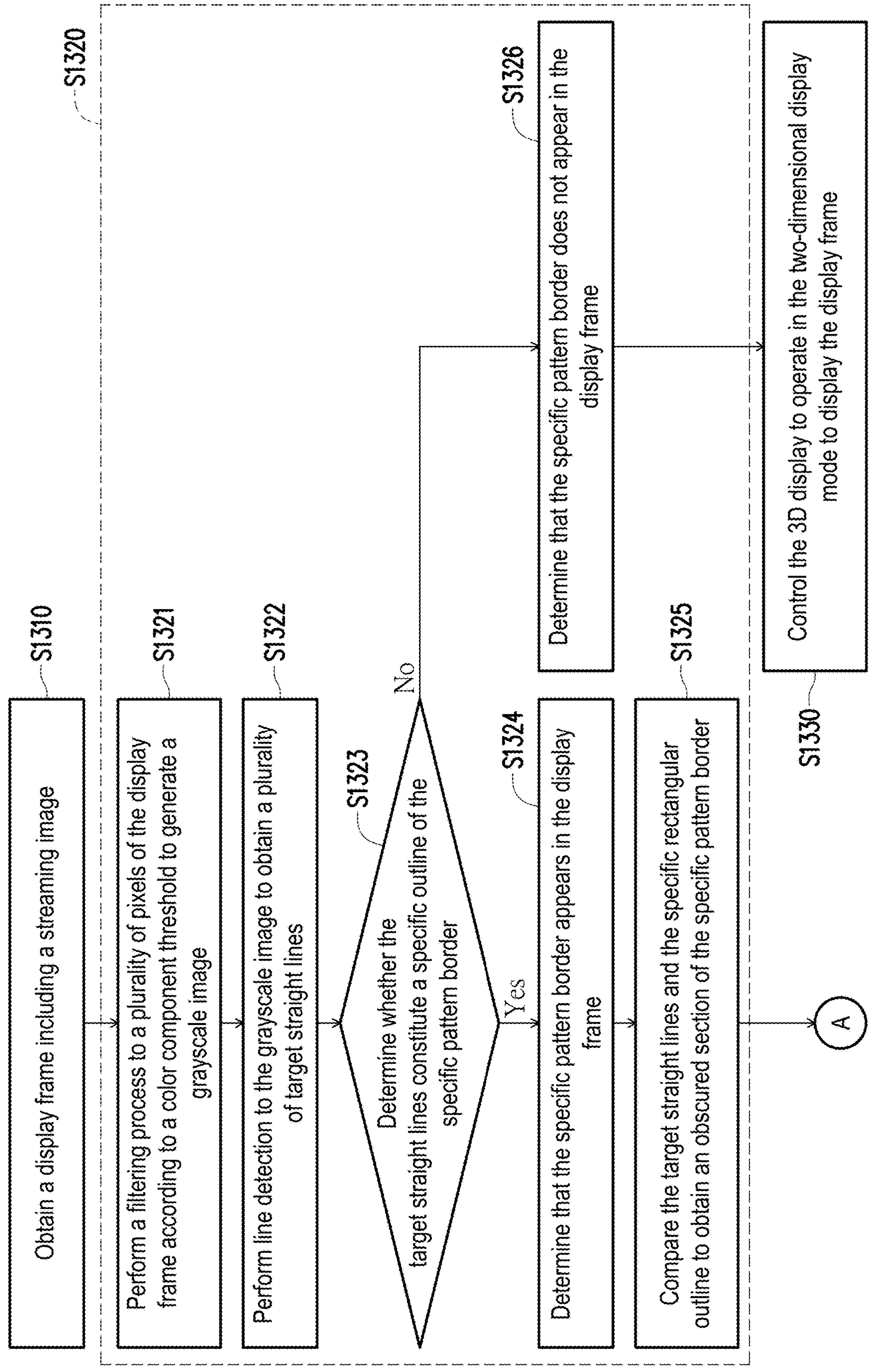
FIG. 13A and FIG. 13B are flowcharts of a stereoscopic image display method according to an embodiment of the disclosure.
Figure 13B:
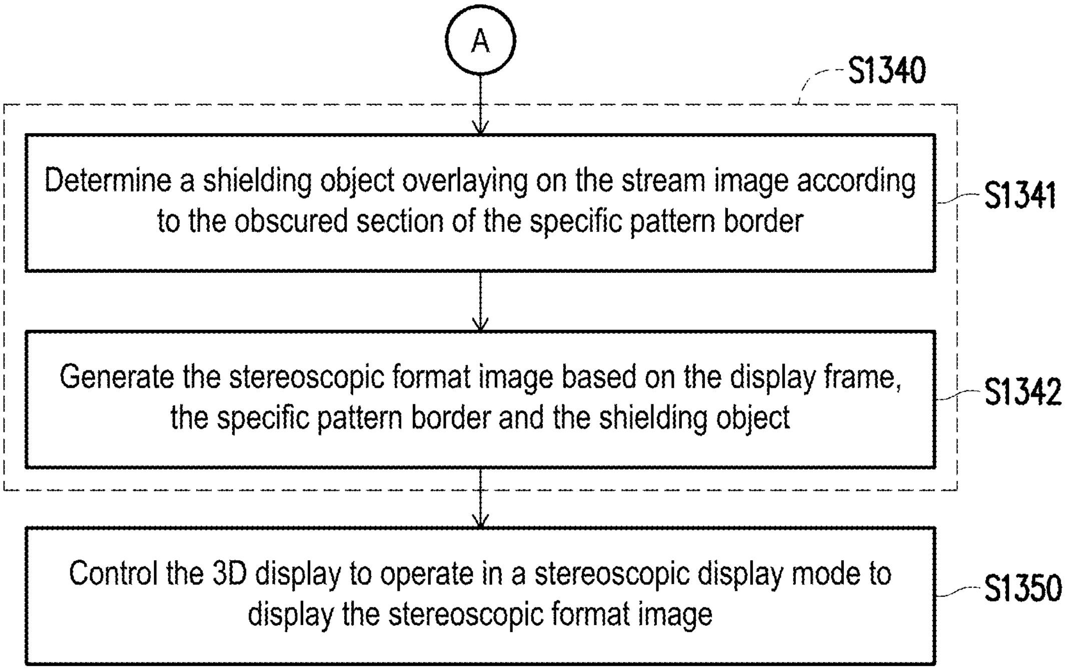
Figure 14:
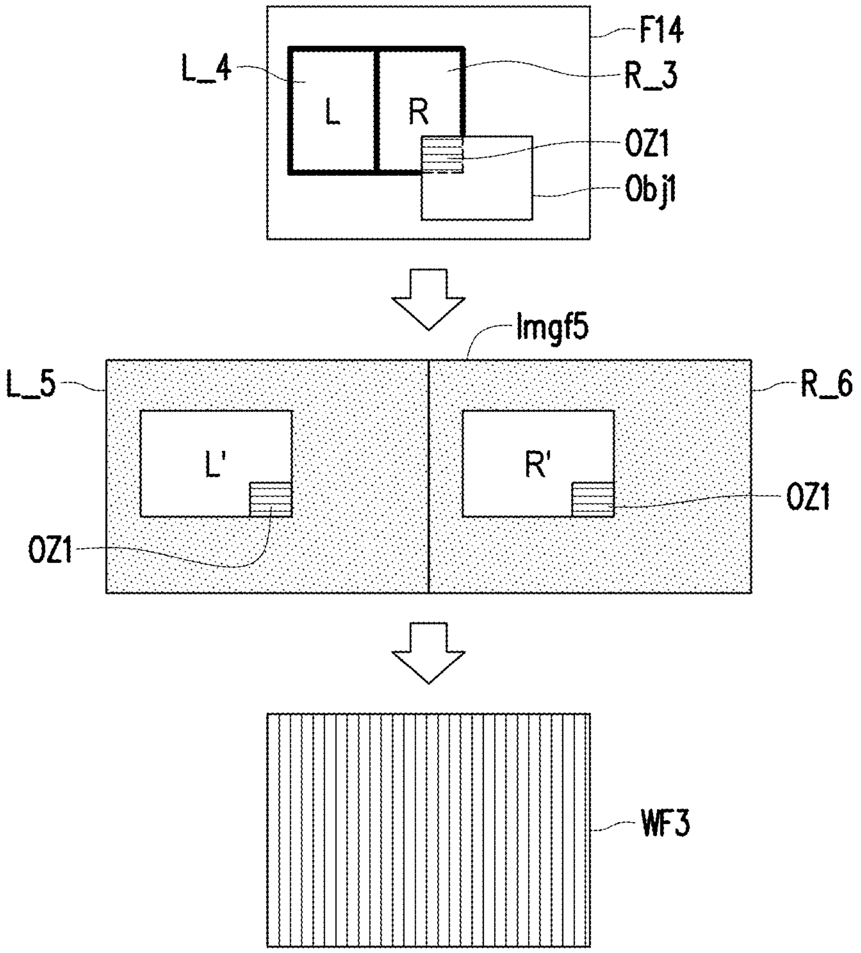
FIG. 14 is a schematic diagram of generating a stereoscopic format image based on an shielding object according to an embodiment of the disclosure.

FIG. 13A and FIG. 13B are flowcharts of a stereoscopic image display method according to an embodiment of the disclosure. Referring to FIG. 13A and FIG. 13B, the operation process of this embodiment is applicable to the electronic apparatus 100 in the above embodiment. The detailed steps of this embodiment are described below with reference to various components in the electronic apparatus 100. To clearly illustrate the principles of this embodiment, the explanation is supplemented with FIG. 14. FIG. 14 is a schematic diagram of generating stereoscopic format images and weaving frames according to an embodiment of the disclosure.

Referring to FIG. 13 and FIG. 14 together, in step S1310, the processor 140 may obtain a display frame F14 including a streaming image. In step S1320, the processor 140 may detect a specific pattern border surrounding the streaming image in the display frame F14 by performing line detection. In one embodiment, step S1320 may be implemented as step S1321 to step S1326.

In step S1321, the processor 140 may perform a filtering processing to pixels of the display frame F14 according to the color component threshold to generate a grayscale image. In step S1322, the processor 140 may perform line detection on the grayscale image to obtain multiple target straight lines. In step S1323, the processor 140 may determine whether the target straight lines constitute a specific outline of a specific pattern border.

If the determination in step S1323 is no, in step S1326, the processor 140 may determine that the specific pattern border does not appear in the display frame. Therefore, in step S1330, in response to the specific pattern border not appearing in the display frame, the processor 140 may control the 3D display 120 to operate in the two-dimensional display mode to display the display frame.

If the determination in step S1323 is yes, in step S1324, the processor 140 may determine that the specific pattern border appears in the display frame F14. The streaming image in the display frame F14 may include a left-eye image L_4 and a right-eye image R_3. Next, in step S1325, in response to determining that the specific pattern border appears in the display frame F14, the processor 140 may compare a plurality of target straight lines with the specific rectangular outline to obtain the obscured section of the specific pattern border. As shown in FIG. 14, the display frame F14 may include an shielding object Obj1 overlayed on the streaming image. The obscuring object Obj1 may be a window or any user interface element. Based on the existence of the shielding object Obj1, the processor 140 may detect an incomplete specific pattern border, that is, the specific pattern border at the lower right corner of the right-eye image R_3 is lacking. In this case, the processor 140 may compare the target straight lines constituting the specific rectangular outline with the specific rectangular outline to obtain the obscured section of the specific pattern border. When the obscured section of the specific pattern border exists, it means that part of the streaming image in the display frame is blocked. In order to generate left-eye image and left-eye image with consistent content in a stereoscopic format image, the processor 140 needs to perform additional processing on the obscured area of the streaming image.

Next, in step S1340, in response to the specific pattern border appearing in the display frame F14, the processor 140 may generate a stereoscopic format image based on the display frame and the specific pattern border. In this embodiment, step S1340 may be implemented as step S1341 to step S1342.

In step S1341, the processor 140 may determine a shielding object Obj1 overlaying on the streaming image in the frame F14 according to the obscured section of the specific pattern border. According to the position and length of the obscured section of the specific pattern border, the processor 140 may identify the shielding object Obj1 and retrieve the shield image area OZ1 of the shielding object Obj1 that shields the streaming image in the display frame F14.

In step S1342, the processor 140 may generate the stereoscopic format image Imgf5 based on the display frame F14, the specific pattern border and the shielding object Obj. Unlike the embodiment in FIG. 10, both the left-eye image L_5 and the right-eye image L_6 of the stereoscopic format image Imgf5 include shield image blocks OZ1 of the shielding object Obj1. The shield image area OZ1 is the partial image area where the shielding object Obj1 overlaps with the streaming image. In some embodiments, there is no parallax between the shield image area OZ1 in the left-eye image L_5 and the shield image area OZ1 in the right-eye image L_6. Synchronously placing the shield image block OZ1 in different perspective images is similar to the operation of duplicating user interface elements in the embodiment depicted in FIG. 12.

In step S1350, in response to the specific pattern border appearing in the display frame F14, the processor 140 may control the 3D display 120 to operate in the stereoscopic display mode to display the stereoscopic format image Imgf5. Furthermore, the processor 140 may perform image weaving processing on the stereoscopic format image Imgf5, and drive the 3D display 120 to display the weaving frame WF3.

Figure 15:
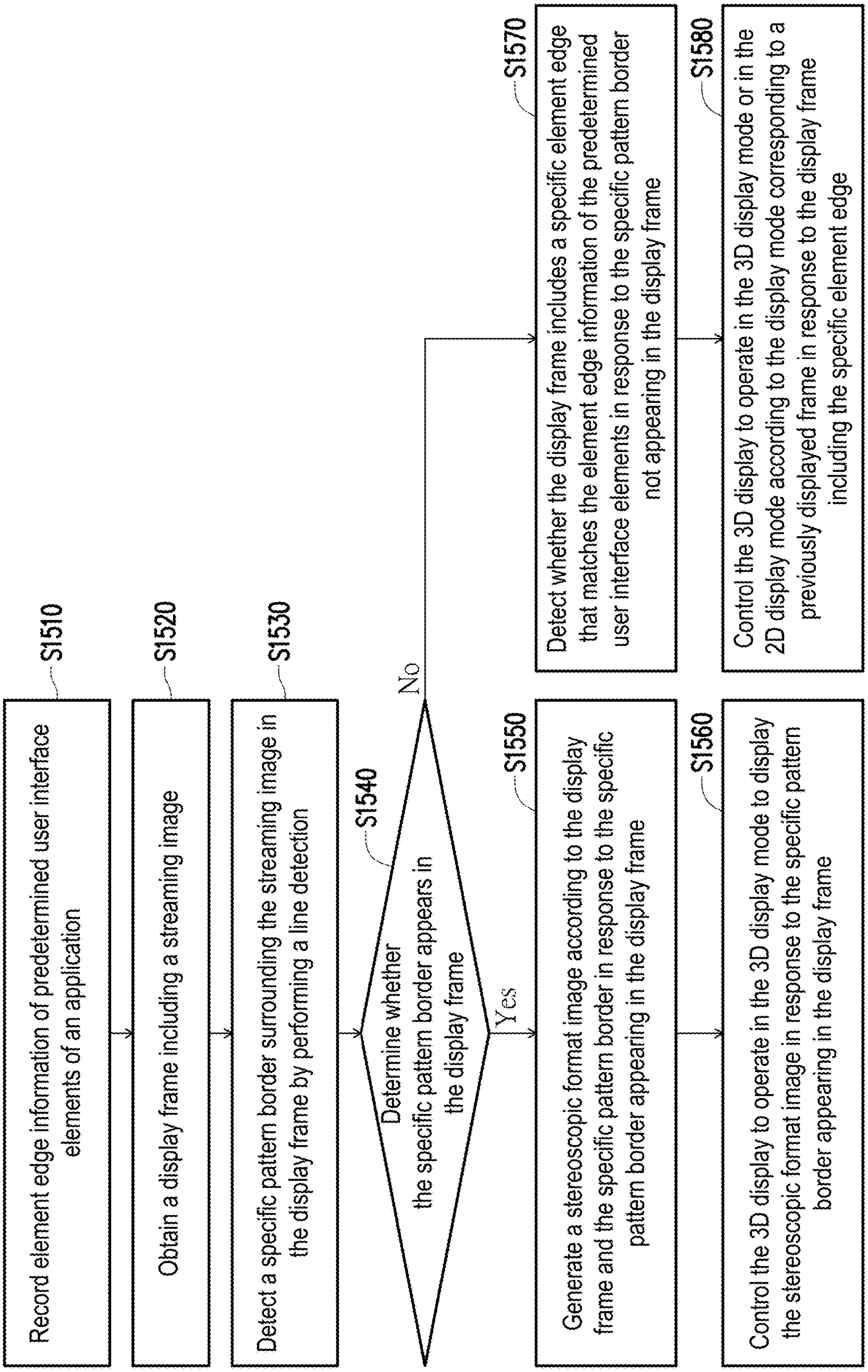
FIG. 15 is a flowchart of a stereoscopic image display method according to an embodiment of the disclosure.

FIG. 15 is a flowchart of a stereoscopic image display method according to an embodiment of the disclosure. Referring to FIG. 15, the operation process of this embodiment is applicable to the electronic apparatus 100 in the above embodiment. The detailed steps of this embodiment are described below with reference to various components in the electronic apparatus 100.

It should be noted that, the graphical user interface (GUI) of the application may have user interface elements that affect the detection of the specific pattern border. For example, user interface elements may obscure the specific pattern border, etc. In one embodiment, element edge information of the predetermined user interface element overlayed on a specific pattern border may be recorded in advance. When the processor 140 detects the presence of a predetermined user interface element in a displayed frame, the processor 140 may reuse the recognition result of the specific pattern border based on the previously displayed frame.

In step S1510, the processor 140 may record element edge information of the predetermined user interface elements of an application. The presence of these predetermined user interface elements affects the detection result of the specific pattern border in the streaming image. Since the window operating interface of the application is known, the storage device 130 may pre-record the element edge information of these predetermined user interface elements.

In step S1520, the processor 140 may obtain a display frame including a streaming image. In step S1530, the processor 140 may detect the specific pattern border surrounding the streaming image in the display frame by performing line detection. In step S1540, the processor 140 may determine whether a specific pattern border appears in the display frame. In step S1550, in response to the specific pattern border appearing in the display frame, the processor 140 generates a stereoscopic format image according to the display frame and the specific pattern border. In step S1560, in response to the specific pattern border appearing in the display frame, the processor 140 controls the 3D display 120 to operate in the stereoscopic display mode to display the stereoscopic format image. The detailed operations from step S1520 to step S1560 may be described with reference to the foregoing embodiments, and will not be described again here.

It should be noted that in step S1570, in response to the specific pattern border not appearing in the display frame, the processor 140 may detect whether the display frame includes a specific element edge that matches the element edge information of the of predetermined user interface elements. The element edge information of each predetermined user interface element includes an edge color, an element outline, an element size, etc. In some embodiments, the processor 140 may detect whether the display frame includes a specific element edge that matches the element edge information through edge detection and color recognition.

If the determination of step S1570 is yes, it means that a certain predetermined user interface element appears in the display frame. Therefore, in step S1580, in response to the display frame including a specific element edge that matches the element edge information of the predetermined user interface elements, the processor 140 may control the 3D display 120 to operate in the stereoscopic display mode or 2D display mode according to the display mode corresponding to a previously displayed frame. If the display mode corresponding to the previously displayed frame is the stereoscopic display mode, the processor 140 controls the 3D display 120 to operate in the stereoscopic display mode. If the display mode corresponding to the previously displayed frame is the two-dimensional display mode, the processor 140 controls the 3D display 120 to operate in the two-dimensional display mode.

In summary, in the disclosure, if a specific patterned border appears within the display frame, the streaming image may be determined to be stereoscopic streaming content conforming to the stereoscopic image format. Furthermore, the image area of the streaming image conforming to the stereoscopic image format can be determined based on the specific patterned border, to distinguish the 3D content image area from the two-dimensional background area in the display frame. Subsequently, based on the specific patterned border and the display frame, a stereoscopic format image including left-eye image and right-eye image can be generated, and the 3D display can be operated in stereoscopic display mode to display the stereoscopic format image. Thus, by embedding a specific patterned border in the stereoscopic format image, streaming images conforming to the stereoscopic image format can be accurately detected, enabling the stereoscopic display to automatically provide stereoscopic display functionality. Since the specific patterned border is located on the periphery of the streaming image, the probability of being obscured by other displayed objects is reduced, thereby increasing detection accuracy.

Moreover, by pre-storing element edge information of predetermined user interface elements, it is possible to detect whether any predetermined user interface element appears in the display frame and reuse the recognition results of the specific patterned border from the previous display frame. Based on this, it is possible to avoid the adverse effects of predetermined user interface elements on the recognition of specific pattern borders. Moreover, by copying the user interface elements that appear in an perspective image to another perspective image, the image content of the left-eye image and the right-eye image of the stereoscopic format image may be consistent, thereby improving the 3D display quality.

What is claimed is:

1. A stereoscopic image display method, adapted to an electronic apparatus comprising a 3D display, and comprises:

obtaining a display frame comprising a streaming image;

detecting a specific pattern border having a predetermined color and surrounding the streaming image in the display frame by performing a line detection, wherein the specific pattern border having the predetermined color is embedded in the streaming image;

generating a stereoscopic format image based on the display frame and the specific pattern border in response to the specific pattern border appearing in the display frame; and controlling the 3D display to operate in a stereoscopic display mode to display the stereoscopic format image in response to the specific pattern border appearing in the display frame.

2. The stereoscopic image display method according to claim 1, further comprises:

controlling the 3D display to operate in a two-dimensional display mode to display the display frame in response to the specific pattern border not appearing in the display frame.

3. The stereoscopic image display method according to claim 1, wherein the step of detecting the specific pattern border having a predetermined color and surrounding the streaming image in the display frame by performing the line detection comprises:

performing a filtering process to a plurality of pixels of the display frame according to a color component threshold to generate a grayscale image, wherein the grayscale image comprises a plurality of first grayscale pixels corresponding to a first grayscale and a plurality of second grayscale pixels corresponding to a second grayscale, wherein if a color component of one of the pixels in the display frame is greater than the color component threshold, the one of the pixels is converted into one of the first grayscale pixels, if a color component of another one of the pixels in the display frame is not greater than the color component threshold, the another one of the pixels is converted into one of the second grayscale pixels.

4. The stereoscopic image display method according to claim 3, wherein one of the first grayscale and the second grayscale is white, and the other of the first grayscale and the second grayscale is black.

5. The stereoscopic image display method according to claim 3, wherein the step of detecting the specific pattern border having a predetermined color and surrounding the streaming image in the display frame by performing the line detection further comprises:

performing the line detection on the grayscale image to obtain a plurality of target straight lines;

determining whether the target straight lines constitute a specific outline of the specific pattern border;

determining that the specific pattern border appears in the display frame in response to determining that the target straight lines constitute the specific outline; and determining that the specific pattern border does not appear in the display frame in response to determining that the target straight lines do not constitute the specific outline.

6. The stereoscopic image display method according to claim 5, wherein the step of determining whether the target straight lines constitute the specific outline of the specific pattern border comprises:

determining whether a plurality of first target straight lines among the target straight lines constitute a specific rectangular outline; and determining whether a second target straight line being vertical and passing through the center of the specific rectangular outline exists in the grayscale image.

7. The stereoscopic image display method according to claim 5, wherein the target straight lines comprise a plurality of vertical straight lines and a plurality of horizontal straight lines.

8. The stereoscopic image display method according to claim 5, wherein detecting the specific pattern border having a predetermined color and surrounding the streaming image in the display frame by performing the line detection further comprises:

comparing the target straight lines and the specific rectangular outline to obtain an obscured section of the specific pattern border in response to determining that the target straight lines constitute the specific rectangular outline, wherein the step of generating the stereoscopic format image based on the display frame and the specific pattern border in response to the specific pattern border appearing in the display frame comprises:

obtaining a shielding object overlaying on the streaming image according to the obscured section of the specific pattern border; and generating the stereoscopic format image according to the display frame, the specific pattern border and the shielding object.

9. The stereoscopic image display method according to claim 1, the step of generating the stereoscopic format image based on the display frame and the specific pattern border in response to the specific pattern border appearing in the display frame comprises:

dividing the display frame into a streaming content block and a two-dimensional background image block according to position and size of the specific pattern border, wherein the streaming content block comprises the streaming image that conforms to the stereoscopic image format;

synthesizing a first perspective image of the streaming image in the streaming content block and the two-dimensional background image block into a first perspective image of the stereoscopic format image; and synthesizing a second perspective image of the streaming image in the streaming content block and the two-dimensional background image block into a second perspective image of the stereoscopic format image.

10. The stereoscopic image display method according to claim 9, wherein the step of generating the stereoscopic format image based on the display frame and the specific pattern border in response to the specific pattern border appearing in the display frame comprises:

copying a user interface element to generate a copied user interface element; and overlaying the copied user interface element on the second perspective image of the stereoscopic format image according to the position of the user interface element, so that the first perspective image of the stereoscopic format image comprises the user interface element and the second perspective image of the stereoscopic format image comprises the copied user interface element.

11. The stereoscopic image display method according to claim 1, further comprises:

recording element edge information of a plurality of predetermined user interface elements of an application;

in response to the specific pattern border not appearing in the display frame, detecting whether the display frame comprises a specific element edge that matches the element edge information of the predetermined user interface elements; and in response to the display frame comprising the specific element edge that matches the element edge information of the preset user interface elements, controlling the 3D display to operate in the stereoscopic display mode or 2D display mode according to a display mode corresponding to a previously displayed frame.

12. The stereoscopic image display method according to claim 1, wherein the step of obtaining the display frame comprising the streaming image comprises:

obtaining the display frame comprising the streaming image by issuing a screenshot function.

13. An electronic apparatus, comprising:

a transceiver, configured to receive a streaming image;

a 3D display; and at least one processor, coupled to the transceiver and the 3D display, and configured to:

obtain a display frame comprising a streaming image;

detect a specific pattern border having a predetermined color and surrounding the streaming image in the display frame by performing a line detection, wherein the specific pattern border having the predetermined color is embedded in the streaming image;

generate a stereoscopic format image based on the display frame and the specific pattern border in response to the specific pattern border appearing in the display frame; and control the 3D display to operate in a stereoscopic display mode to display the stereoscopic format image in response to the specific pattern border appearing in the display frame.

14. The electronic apparatus according to claim 13, wherein the processor is further configured to:

control the 3D display to operate in a two-dimensional display mode to display the display frame in response to the specific pattern border not appearing in the display frame.

15. An electronic apparatus according to claim 13, wherein the processor is further configured to:

perform a filtering process to a plurality of pixels of the display frame according to a color component threshold to generate a grayscale image, wherein the grayscale image comprises a plurality of first grayscale pixels corresponding to a first grayscale and a plurality of second grayscale pixels corresponding to a second grayscale, wherein if a color component of one of the pixels in the display frame is greater than the color component threshold, the one of the pixels is converted into one of the first grayscale pixels, if a color component of another one of the pixels in the display frame is not greater than the color component threshold, the another one of the pixels is converted into one of the second grayscale pixels.

16. The electronic apparatus according to claim 15, wherein the processor is further configured to:

perform the line detection on the grayscale image to obtain a plurality of target straight lines;

determine whether the target straight lines constitute a specific outline of the specific pattern border;

determine that the specific pattern border appears in the display frame in response to determining that the target straight lines constitute the specific outline; and determine that the specific pattern border does not appear in the display frame in response to determining that the target straight lines do not constitute the specific outline.

17. The electronic apparatus according to claim 16, wherein the processor is further configured to:

determining whether a plurality of first target straight lines among the target straight lines constitute a specific rectangular outline; and determining whether a second target straight line being vertical and passing through the center of the specific rectangular outline exists in the grayscale image.

18. The electronic apparatus according to claim 16, wherein the processor is further configured to:

compare the target straight lines and the specific rectangular outline to obtain an obscured section of the specific pattern border in response to determining that the target straight lines constitute the specific rectangular outline;

obtain a shielding object overlaying on the streaming image according to the obscured section of the specific pattern border; and generate the stereoscopic format image according to the display frame, the specific pattern border and the shielding object.

19. The electronic apparatus according to claim 13, wherein the processor is further configured to:

divide the display frame into a streaming content block and a two-dimensional background image block according to position and size of the specific pattern border, wherein the streaming content block comprises the streaming image that conforms to the stereoscopic image format;

synthesize a first perspective image of the streaming image in the streaming content block and the two-dimensional background image block into a first perspective image of the stereoscopic format image; and synthesize a second perspective image of the streaming image in the streaming content block and the two-dimensional background image block into a second perspective image of the stereoscopic format image.

20. The electronic apparatus according to claim 19, wherein the processor is further configured to:

copy a user interface element to generate a copied user interface element; and overlay the copied user interface element on the second perspective image of the stereoscopic format image according to the position of the user interface element, so that the first perspective image of the stereoscopic format image comprises the user interface element and the second perspective image of the stereoscopic format image comprises the copied user interface element.

21. The electronic apparatus according to claim 13, wherein the processor is further configured to:

record element edge information of a plurality of predetermined user interface elements of an application;

in response to the specific pattern border not appearing in the display frame, detect whether the display frame comprises a specific element edge that matches the element edge information of the predetermined user interface elements; and in response to the display frame comprising the specific element edge that matches the element edge information of the preset user interface elements, control the 3D display to operate in the stereoscopic display mode or 2D display mode according to a display mode corresponding to a previously displayed frame.

22. The electronic apparatus according to claim 13, wherein the processor is further configured to:

obtain the display frame comprising the streaming image by suing-issuing a screenshot function.

* * * * *